United States Patent [19]
Katsuo et al.

[11] Patent Number: 5,721,883
[45] Date of Patent: Feb. 24, 1998

[54] SYSTEM AND METHOD FOR IMPLEMENTING PARALLEL IMAGE PROCESSING

[75] Inventors: Satoshi Katsuo; Taro Shigata, both of Kanagawa, Japan

[73] Assignee: Sony Corporation, Tokyo, Japan

[21] Appl. No.: 535,218

[22] PCT Filed: Mar. 24, 1995

[86] PCT No.: PCT/JP95/00552

§ 371 Date: Jan. 23, 1996

§ 102(e) Date: Jan. 23, 1996

[87] PCT Pub. No.: WO95/26530

PCT Pub. Date: Oct. 5, 1995

[30] Foreign Application Priority Data

Mar. 28, 1994 [JP] Japan ................. 6-057141
Mar. 28, 1994 [JP] Japan ................. 6-057142

[51] Int. Cl.⁶ .................................. G06F 15/80
[52] U.S. Cl. ............................ 395/505; 395/706
[58] Field of Search ..................... 395/706, 800, 395/505, 501, 524

[56] References Cited

U.S. PATENT DOCUMENTS

| | | | |
|---|---|---|---|
| 5,088,034 | 2/1992 | Ihara et al. | 395/706 |
| 5,230,053 | 7/1993 | Zaiki et al. | 395/706 |
| 5,437,034 | 7/1995 | Tanaka et al. | 395/706 |

FOREIGN PATENT DOCUMENTS

60-140456  7/1985  Japan.
5-12033    1/1993  Japan.

OTHER PUBLICATIONS

Microprocessing And Microprogramming, vol. 30, No. 1/05, Aug. 1, 1990 pp. 365–370, XP000141671 Vasconcelos N Q Et Al. "An Environment For Parallel Programming In Pascal1" *paragraph 3* *paragraph 5*.

Journal Of Parallel And Distributed Computing, vol. 6, No. 3, Jun. 1, 1989 pp. 598–622, XP 000133097 Chu C H "A Model For An Intelligent Operating System For Executing Image Understanding Tasks On A Reconfigurable Parallel Architecture" *p. 607, line 3 –line 31*.

Computer Technology Review, vol. VI, No. 3, 1986 Los Angeles US, pp. 41–45 P. Hampton And R. Denker "Multiprocessors APs simplify calculations for image processing" *p. 45, line 14 –line 27; figure 1,2*.

Hasebe, Jun et al., "Real Time Image Processing System SIPS –High-Speed Processing Method–", *IPSJ General Convention Lecture Transaction*, vol. 35th, No. 3, pp. 2017–2018 (1987).

*Primary Examiner*—Kee M. Tung
*Attorney, Agent, or Firm*—William S. Frommer; Alvin Sinderbrand

[57] ABSTRACT

A system for performing parallel processing of images. The image data to be processed is supplied to multiple arithmetic processors by a data supply control unit. Each of the processors operates on a portion of the data to produce a multiple of partial image processing results, and the partial results are integrated to form a final result. Thereby, allowing image processing to be conducted at an increased speed.

6 Claims, 7 Drawing Sheets

RELATIONSHIP BETWEEN NO. OF PIXELS
AND PIXEL BLOCK OF ONE PICTURE

VIEW FOR EXPLAINING ORDER OF DATA
SUPPLY OF PIXEL BLOCK ethod for parallel processing program which
can suppress increase in execution codes to be generated
without making heavy burden on the program developer.

SYSTEM AND METHOD FOR IMPLEMENTING PARALLEL IMAGE PROCESSING

TECHNICAL FIELD

This invention relates to a compiling method for parallel processing program which generates execution codes of a program prepared by using program language for allowing a plurality of arithmetic processors to carry out image processing in parallel, an image processing apparatus for carrying out image processing by parallel processing of a plurality of operations, and an image processing method for allowing the image processing apparatus to be operative.

BACKGROUND ART

Generally, in the parallel processing system, in distributing procedure (processing) defined by user to a plurality of processors to allow them to carry out parallel processing, the program developer carries out description and preparation of program so as to carry out these distributed procedures every respective processors.

When the procedure defined by user is assumed to be load in the parallel processing system, the program developer prepares source program so that distribution of load with respect to respective processors is suitably carried out in advance in a parallel processing system as described above.

Accordingly, the program developer must describe source program so that load to individual processors is intentionally distributed in order to realize the processing of high efficiency.

However, in the preparation of the program, the work in which distribution of load to individual processors is caused to be conscious would be forced on the program developer by the number of processors to which load is distributed. This heavily makes the burden on the program developer.

In the image processing using such a parallel processing system, in the case where picture division processing is carried out, there are instances where the number of small areas obtained by division is greater than the number of processors and the number of small areas cannot be divided (is indivisible) by the number of processors, so there results remainder area, i.e., fraction area in picture. When such fraction area takes place, any one of the processors would be caused to carry out fraction processing with respect to the fraction area.

Moreover, in the case where load is distributed, when processing for integrally performing operation of results of image processing in small areas obtained by dividing a picture is imposed on a portion of processors, the portion of the processors is required to have two kinds of execution codes of execution code for arithmetic processing with respect to the small areas and the above-described integration processing execution code for integrally performing operation. Because preparation of such a program causes the program developer to carry out preparation of program in which the above-mentioned integration processing is caused to be conscious as well, the burden is heavier than the burden described above.

Further, two kinds of execution codes are delivered to the processor, whereby the execution code quantity with respect to the processor would increase to more degree as compared to the execution code quantity for arithmetic processing with respect to the small areas. In addition, such integration processing is supplemented, whereby the capacity of memory used is spent substantially twice.

This invention has been made in view of actual circumstances as described above, and its object is to provide a compiling method for parallel processing program which can suppress increase in execution codes to be generated without making heavy burden on the program developer.

Another object of this invention is to provide an image processing apparatus and an image processing method adapted for generating execution codes in dependency upon, e.g., application program used, etc., thus making it possible to carry out image processing of which efficiency is higher than that of the prior art.

DISCLOSURE OF THE INVENTION

With a view to solving the above-described problems, a compiling method for parallel processing program according to this invention is directed to a compiling method for parallel processing program, which compiles program prepared by using program language for allowing a plurality of arithmetic processors to carry out, in parallel, image processing to generate execution codes, the method comprising: an analysis step of carrying out identification and analysis of control statement to which identifier indicating parallel processing in the image processing is attached from the prepared program; and an execution code generating step of generating execution codes of parallel processing to respective arithmetic processors corresponding to analysis result by the analysis step and the number of the plural arithmetic processors.

Moreover, an image processing method according to this invention is directed to an image processing method for carrying out image processing in accordance with execution codes of program prepared by using program language which allows a plurality of arithmetic processors to carry out image processing in parallel, the method comprising: an analysis step of carrying out identification and analysis of control statement to which identifier indicating parallel processing in the image processing is attached from the prepared program; an execution code generating step of generating execution codes of parallel processing to respective arithmetic processors corresponding to analysis result by the analysis step and the number of the plurality of arithmetic processors; and an image processing step in which the arithmetic processors respectively carry out image processing on the basis of the prepared execution codes.

In addition, an image processing apparatus according to this invention is directed to an image processing apparatus adapted for carrying out image processing by parallel processing of a plurality of operations, the apparatus comprising: a plurality of arithmetic means for respectively carrying out, in parallel, operations of image processing with respect to respective small areas obtained by dividing a picture of an inputted picture signal; and data supply control means for carrying out integral operation on the basis of respective operation results from the arithmetic means.

BEST MODE FOR CARRYING OUT THE INVENTION

Embodiments of a compiling method for parallel processing program, an image processing apparatus, and an image processing method according to this invention will now be described with reference to the attached drawings.

The compiling method for parallel processing program of this invention is a method comprising: analyzing a prepared program at an analysis step; discriminating, at an execution code generating step, between program of arithmetic processors and programs except for the above on the basis of analysis result by the analysis step to generate execution codes, thereby to generate execution codes of processors which play respective roles.

In this embodiment, an example of an image processing apparatus (unit) to which the above-mentioned method is applied will be described.

Figure 1:
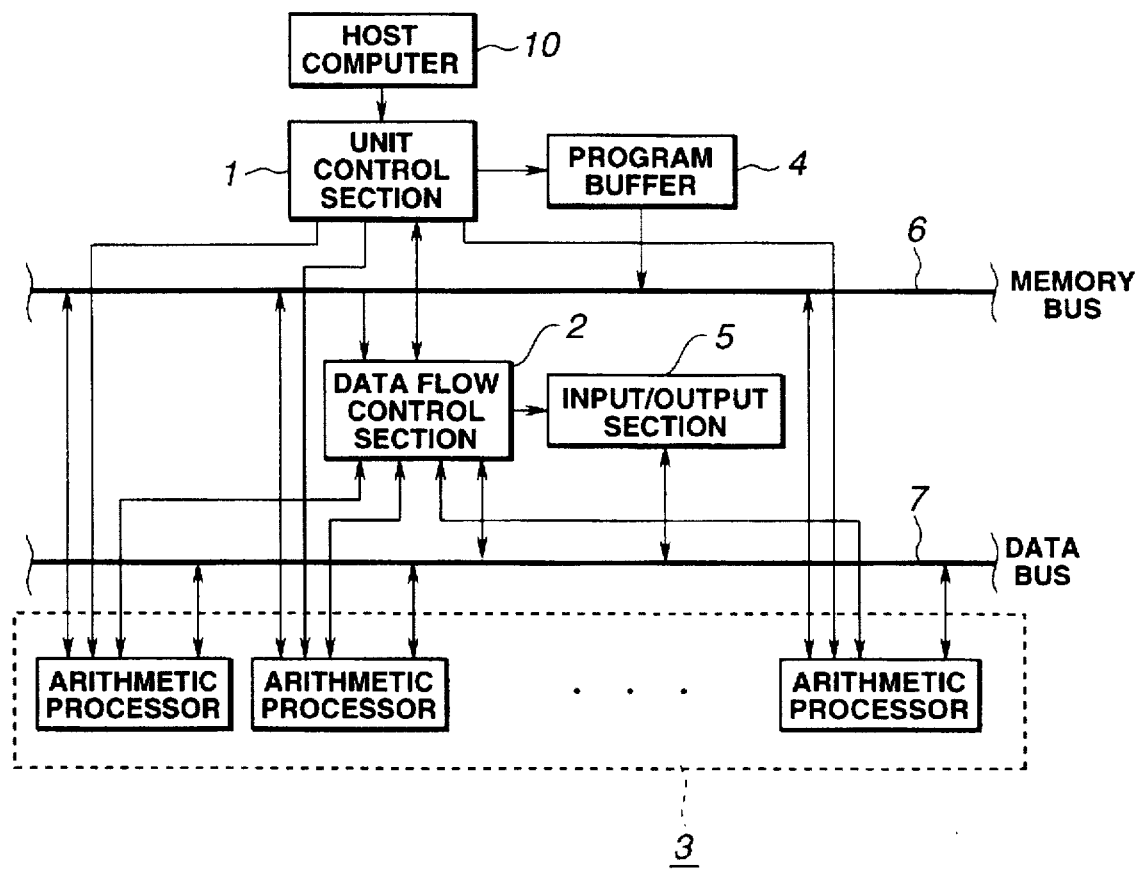
FIG. 1 is a block diagram showing outline of the configuration of an image processing apparatus according to this invention.

The image processing unit comprises, as shown in FIG. 1, for example, a unit control section 1 for controlling the entirety, a data flow control section 2 for controlling flow of data, an arithmetic section 3 having a plurality of arithmetic processors, a program buffer 4, and an input/output section 5.

The unit control section 1 controls the program buffer 4 to load program corresponding to the data flow control section 2 and the arithmetic section 3 on the program buffer 4 into program memory within the processor of the data flow control section 2 and program memories within respective arithmetic processors of the arithmetic section 3 through a memory bus 6. Moreover, the unit control section 1 carries out execution control of respective arithmetic processors of the data flow control section 2 and the arithmetic section 3 and supply of clock thereto.

The data flow control section 2 carries out integral operation on the basis of respective operation results from the arithmetic section 3, and distributes and delivers this operation result to the arithmetic section 3 as occasion demands. Explanation will now be given in more practical sense. The data flow control section 2 delivers a control signal to a shared memory (not shown) within the input/output section 5. Thus, the data flow control section 2 carries out a control to distribute data to distributed memories (not shown) within respective arithmetic processors through a data bus 7 from the shared memory. Moreover, the data flow control section 2 carries out transmission and reception of control signals with respect to respective arithmetic processors of the arithmetic section 3 to collect, from the arithmetic processor in which arithmetic processing with respect to the delivered data has been completed, the processing result. Then, the data flow control section 2 carries out a control to deliver data of the processing result to the shared memory within the input/output section 5 through the data bus 7. The data flow control section 2 carries out a control to distribute the next data through the data bus 7 from the shared memory with respect to the arithmetic processor in which the arithmetic processing has been completed. In a manner stated above, the data flow control section 2 repeats distribution and collection of data to carry out a control until the program of the data flow control section 2 has been completed.

As stated above, the image processing unit is such that parallel processing is implemented to a delivered picture signal so that speed of image processing is caused to be higher. Moreover, this image processing unit is adapted so that respective arithmetic processors execute the same program with respect to a plurality of small areas obtained by dividing picture data. Namely, the image processing unit includes a plurality of arithmetic processors for executing the same program, and thus carries out parallel processing of picture (pictorial image) at a high speed by architecture which divides a single picture into small areas to carry out parallel processing.

Meanwhile, for the image processing, there is such an image processing which is not closed within small areas divided so as to become in correspondence with the model which satisfies this architecture. As such an image processing, there is the case where, e.g., density mean value of all pictures is determined, or the like.

In the image processing unit, when load in the image processing is distributed to a plurality of arithmetic processors to allow a portion of arithmetic processors to carry out integration processing which collects results of respective image processing of the load distribution, two kinds of execution codes of execution code of arithmetic processor for processing of divided areas and execution code of arithmetic processor for integration processing are required for the arithmetic section 3. The execution codes generated in this way do not become model which satisfies the above-described architecture, and quantity of execution codes generated is increased.

In view of the above, the image processing unit to which this invention is applied allows respective arithmetic processors of the arithmetic section 3 to execute shared program on the basis of model which satisfies the architecture to draw up respective arithmetic results at the data flow control section 2 to carry out integration processing to further carry out a processing to deliver this integration processing result to respective arithmetic processors of the arithmetic section 3 to allow them to perform operation, etc.

Meanwhile, in the case where the number of pictures to be processed is great, there has been also proposed a method of allocating pictures to respective arithmetic processors one by one. In the case where the number of pictures to be processed is divisible by the number of arithmetic processors, there is no arithmetic processor running idle during parallel processing, thus making it possible to enhance the degree of parallel processing so that it becomes maximum. Moreover, it also becomes unnecessary to carry out communication between the data flow control section 2 and the arithmetic processors of the arithmetic section 3, which was required in the previously described picture division processing. For this reason, in the case where the number of pictures to be processed is divisible by the number of arithmetic processors, processing speed of the picture parallel processing allocated to respective arithmetic processors by one picture is higher.

However, in the configuration of the image processing unit and the quantitative relationship of picture signal, there are instances where when the number of pictures of a picture signal inputted thereto is divided by the number of arithmetic processors of the arithmetic section 3, the above-mentioned number of pictures cannot be divided by the number of the arithmetic processors, so any remainder takes place.

When there results the state where such a relationship holds, there are instances where, in the image processing unit, the parallelism (degree of parallel processing) is extremely lowered, so efficiency of the image processing is remarkably lowered.

As a more practical example, let now consider the case where pictures (pictorial images) of 17 frames are processed in the configuration where the arithmetic section 3 has, e.g., 16 arithmetic processors. In the arithmetic section 3, in processing the seventeenth frame, only one arithmetic processor becomes operative, and 15 arithmetic processors are inoperative. For this reason, these arithmetic processors would be idle. As a result, efficiency of image processing would be lowered.

In view of the above, this image processing unit has processing modes in connection with both the case where one picture is divided into small areas to allow arithmetic processors to be operative every these small areas, which is in conformity with the model that satisfies the above-described architecture, and the case where pictures are allocated to respective arithmetic processors by one picture to allow them to be operative, which is not in conformity with the model that satisfies the architecture.

Respective processing with respect to different cases are carried out by a host computer 10 which carries out compiling as shown in FIG. 1, for example. Moreover, the host computer 10 also carries out processing with respect to different cases of compiling for carrying out picture division processing including integration processing based on the model of the above-described architecture and compiling for allocating processing every respective pictures to arithmetic processors to thereby realize processing efficiency higher than that of the prior art.

Explanation will now be given in connection with an image processing method for allowing the above-mentioned image processing unit to carry out high speed image processing by parallel processing with reference to the flowcharts of FIGS. 2, 3 and 5, and in connection with pixels that the image processing unit processes and the block configuration thereof with reference to FIG. 4. As described above, execution codes of parallel processing program delivered to the image processing unit after undergone compiling are generated by host computer 10 provided at the outside of the image processing unit.

Figure 2:
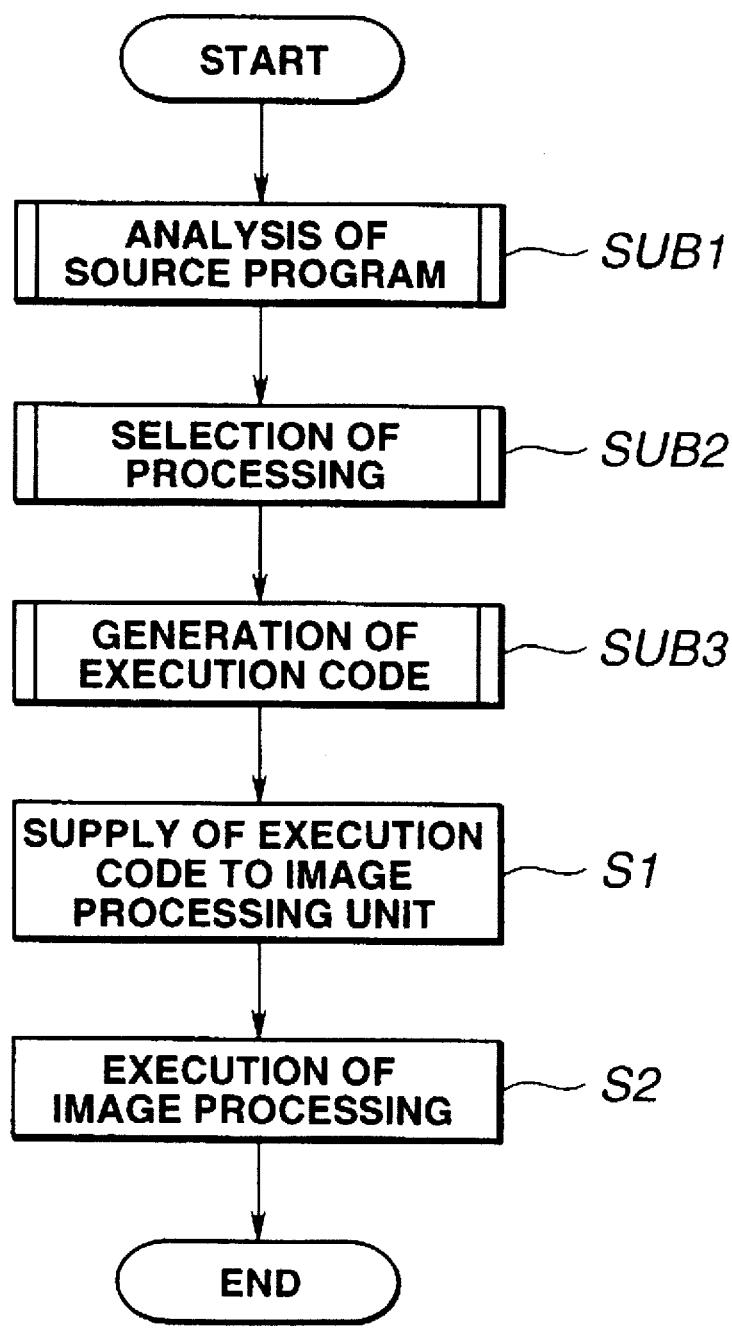
FIG. 2 is a main flowchart for explaining outline of the operation of the image processing apparatus.

The host computer 10 starts compiling of parallel processing program as shown in FIG. 2, for example. Thus, the processing operation proceeds to subroutine SUB1.

At this subroutine SUB1, the host computer 10 carries out identification and analysis of control statement to which there is attached identifier indicating parallel processing in source program of image processing in which procedure of parallel processing program is described. Thus, the processing operation proceeds to subroutine SUB2.

Then, at the subroutine SUB2, the host computer 10 carries out processing discrimination as to whether the image processing is carried out by the picture division processing or is carried out by the picture parallel processing from the relationship between the number of pictures subjected to image processing and the number of a plurality of arithmetic processors of the arithmetic section 3 and analysis result of the subroutine SUB1. Thus, the processing operation proceeds to subroutine SUB3.

At the subroutine SUB3, the host computer 10 carries out generation of execution codes on the basis of the result of the subroutine SUB2.

The host computer 10 carries out processing in order of these three subroutines SUB1 to SUB3 to thereby complete compiling of the parallel processing program. Thus, the processing operation proceeds to step S1.

At the step S1, the host computer 10 delivers execution codes compiled at the subroutines SUB1 to SUB3 to the unit control section 1 of the image processing unit. Then, the unit control section 1 once (temporarily) stores execution codes from the host computer 10 into the program buffer 4 thereafter to carry out a control to allow execution codes of a program corresponding to the data flow control section 2 and the arithmetic section 3 on the program buffer 4 to be loaded into program memories within the processor of the data flow control section 2 and respective arithmetic processors of the arithmetic section 3 through the memory bus 6.

At step S2, respective arithmetic processors of the arithmetic section 3 processes two-dimensional data delivered through the input/output section 5 in units of small areas obtained by dividing one picture, or in one frame units in dependency upon execution codes, and the arithmetic processor of the data flow control section 2 carries out supply/collection of data and/or integration processing of operation results of the arithmetic section 3 in accordance with the execution codes. By such a series of arithmetic processing, image processing is executed at a high speed.

Further, the procedure of the above-described subroutines SUB1 to SUB3 will be described below.

In this example, in source program of the parallel processing program, language in conformity with so called C language which is one of high-level languages is used.

At the subroutine SUB1, analysis is conducted by the prepared source program as to whether or not there is, within "function", integral arithmetic processing, which is one arithmetic processing, such that operation results carried out in plural small areas by using divided two-dimensional data are used to carry out integral operation, and whether or not there is distribution processing such that the above-mentioned integral operation result is distributed to respective arithmetic processors, etc.

Figure 3:
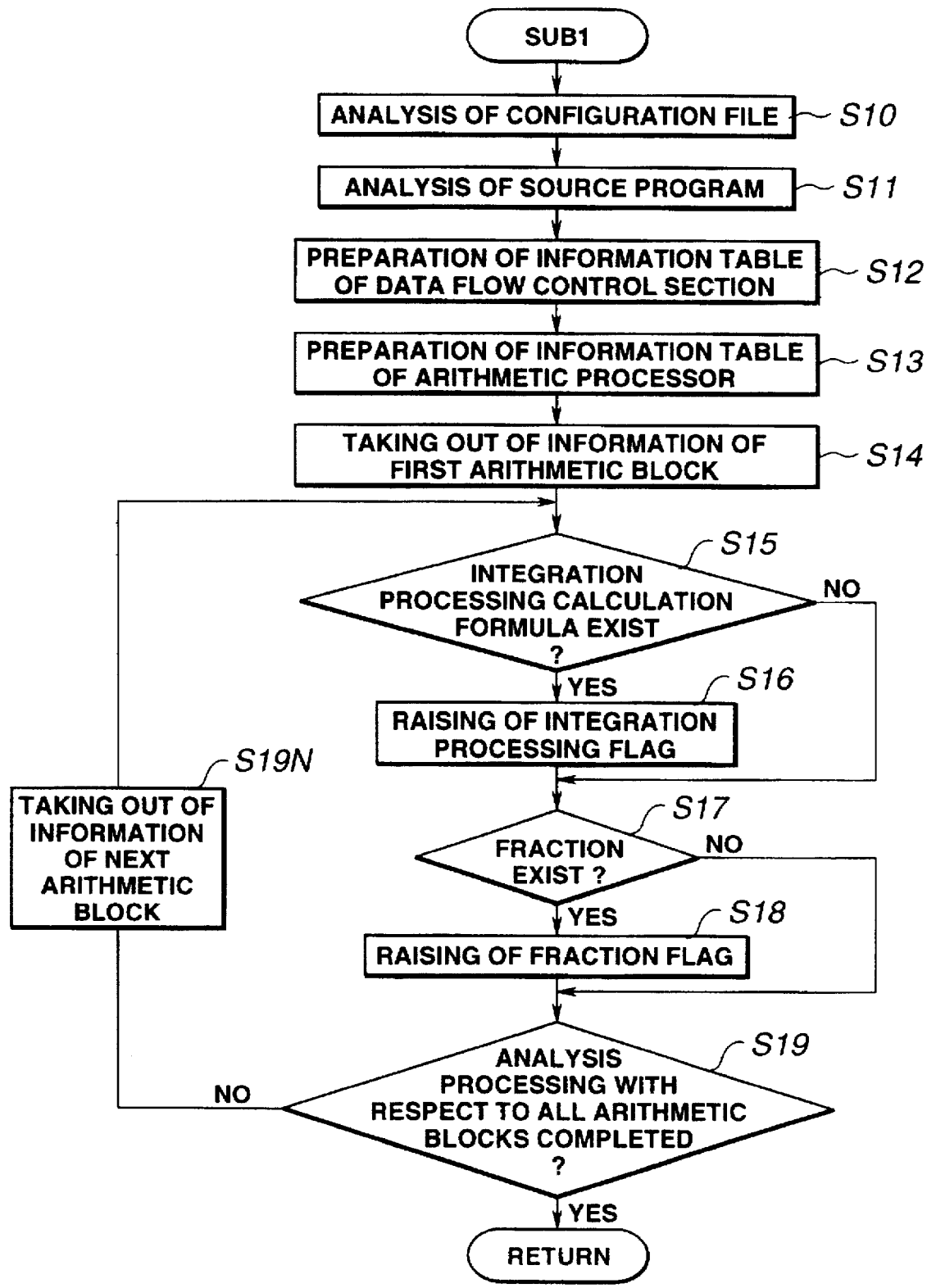
FIG. 3 is a flowchart for explaining processing procedure of the subroutine 1 in the main flowchart.

In more practical sense, at step S10 of the flowchart shown in FIG. 3, the host computer 10 carries out analysis of, e.g., CONFIGURATION FILE (hereinafter simply referred to as CONFIG. FILE) for image processing unit. In the CONFIG. FILE, e.g., information such as No. of arithmetic processors assembled in the arithmetic section 3 in the image processing unit is described as header information. Then, the total number of arithmetic processors that the image processing unit applied has is examined by using such information.

Then, at step S11, the host computer 10 carries out analysis of source program of parallel processing program.

In the language for describing source code of parallel processing program, there are used vfor and hfor for new parallel processing in which "v" and "h" which are identifier serving as key word which gives motivation for carrying out parallel processing in the image processing and respectively signify repetition in a vertical direction and repetition in a horizontal direction are added before, e.g., for statement of the C language indicating repetitive processing. Parameters within the parentheses of the vfor statement and the hfor statement are the same as those of the for statement of the C language.

Similarly, parameters (variables) Vinit and Hinit for new parallel processing relating to small areas obtained by dividing a picture are respectively parameters indicating coordinates in vertical direction and in horizontal direction at left upper position of the small area.

As an example of source program, e.g., format example described below will now be studied.

```
vfor(Vinit=0; Vinit<512; Vinit+=8) {          ... (1-1-1)
   hfor(Hinit=0; Hinit<768; Hinit+=8) {       ... (1-1-2)
      read (x, 8, 8);                         ... (1-1-3)
      ..........
      tmp=x[0]+......                         ... (1-1-4)
      ..........
      write(y, 8, 8);                         ... (1-1-5)
      ..........
      total=total+tmp;                        ... (1-1-6)
   }                                          ... (1-1-7)
}                                             ... (1-1-8)
..........
vfor(Vinit=0; Vinit<512; Vinit+=8) {          ... (1-2-1)
   hfor(Hinit=0; Hinit<768; Hinit+=8) {       ... (1-2-2)
      read(x, 8, 8);                          ... (1-2-3)
      ..........
      tmp=total+......                        ... (1-2-4)
      ..........
      write(y, 8, 8);                         ... (1-2-5)
      ..........
   }                                          ... (1-2-6)
}                                             ... (1-2-7)
```

Figure 4A:
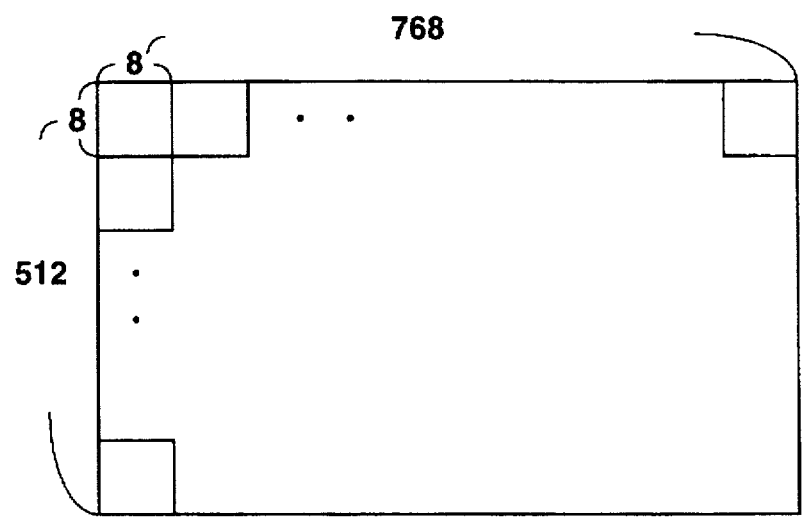
FIGS. 4A and 4B are model view for explaining the relationship between picture configuration of the image processing apparatus and small divided areas and way of movement of the small divided area.
Figure 4B:
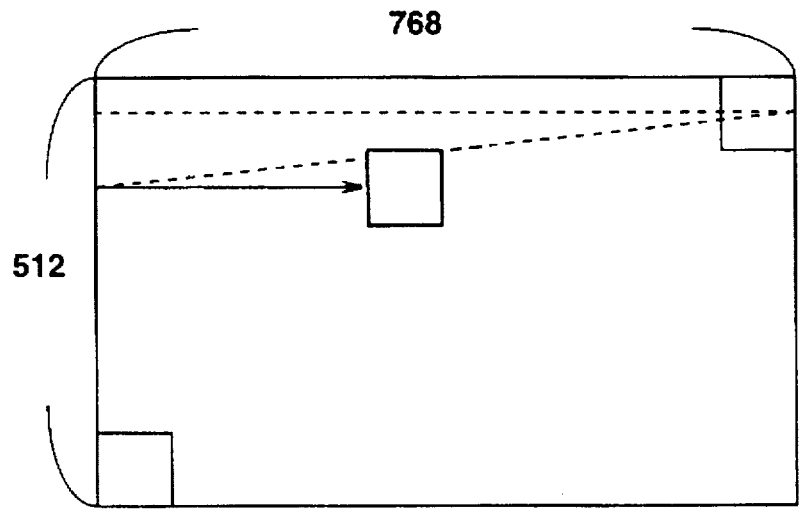

Parameters within the parentheses of the vfor statement and the hfor statement of the source program, i.e., Vinit=0; Vinit<512 and Hinit=0; Hinit<768 represent as shown in FIG. 4(a) that picture consists of 512×768 pixels. Vinit+=8 and Hinit+=8 represent that small areas obtained by dividing the picture consist of block of size of 8×8 pixels. Moreover, Vinit=0 and Hinit=0 represent as shown in FIG. 4(b) that read processing or write processing from/into small areas is first carried out from the left upper toward the right end of the picture by the hfor statement, and read processing or write processing from/into small area at the left end position corresponding to the next line is then carried out by the vfor statement.

For read or write processing of the small area, read statement and write statement are used. The first argument x of the read statement and the write statement is buffer (arrangement) name for storing small area, the second argument is size designation in a horizontal direction, and the third argument is size designation in a vertical direction.

When attention is drawn to the vfor statement of the statements (1-1-1), (1-2-1), the hfor statement of the statements (1-1-2), (1-2-2), the read statement of the statements (1-1-3), (1-2-3), and the write statement of the statements (1-1-5), (1-2-5), the host computer 10 can recognize, at step S11, parameters of the small area necessary for generation of execution codes of the data flow control section 2 by analysis of the source program. Namely, the host computer 10 can recognize, by analysis of the source program, sizes in horizontal/vertical directions, the initial position and way of movement of one small area. Namely, the total number of small areas to be processed of the entirety of the picture can be seen from the vfor statement and the hfor statement.

Then, at step S12, the host computer 10 prepares information table of the data flow control section 2 on the basis of analysis result at the step S11. Thus, the processing operation proceeds to step S13.

At the step S13, the host computer 10 prepares information table relating to processing of the arithmetic processor within the source program. Information table relating to the processing of the arithmetic processor is a table in which information obtained by analyzing, e.g., source program encompassed by key word of syntax of vfor of the statement (1-2-1) or hfor of the statement (1-2-1), etc. in the source program with respect to processing for respective small areas are collected.

Then, at step S14, the host computer 10 takes out information of the first arithmetic block. Namely, the host computer 10 reads thereinto information indicating arithmetic processing carried out, with respect to small areas, by arithmetic processor for, e.g., the statement (1-1-4) between the read statement of the statement (1-1-3) and the write statement of the statement (1-1-5), or the statement (1-2-4) between the read statement of the statement (1-2-3) and the write statement of the statement (1-2-5). Here, the arithmetic block is a block which is encompassed by vfor and hfor and describes operation content that the arithmetic processors carry out.

Then, at step S15, the host computer 10 examines whether or not the calculation formula for carrying out the integration processing is included in the arithmetic block which has been read in at the step S14. In the case where there is no calculation formula, such as, for example, the statement (1-1-6) to carry out integration processing with respect to the image processing of the small area (No), the processing operation proceeds to step S17. On the other hand, in the case where there is a calculation formula, such as, for example, the statement (1-1-6) (Yes), the processing operation proceeds to step S16.

At the step S16, the host computer 10 raises, e.g., integration flag (sets "1") so as to allow the arithmetic processor within the data flow control section 2 to perform operation relating to the calculation formula. Thus, the processing operation proceeds to step S17.

It is to be noted that, at step 15, the host computer 10 can also examine presence or absence of distribution of result of integral operation. Namely, in the case where there is no calculation formula, such as, for example, the statement (1-2-4) (No), the processing operation by the host computer 10 proceeds to step S17. On the other hand, in the case where there is a calculation formula such as the statement (1-2-4) (Yes), the processing operation by the host computer 10 may proceed to the step S16 to raise (set) distribution flag at the step S16 to proceed to step S17.

At the step S17, the host computer 10 examines whether or not fraction is produced in allowing respective arithmetic processors to correspond to small areas of the picture. Namely, this fraction indicates remainder obtained when the total number of small areas in dividing the picture into small areas cannot be divided by the total number of arithmetic processors. As a matter of course, the number of fraction of the small area means that it is less than the number of arithmetic processors.

Then, the processing operation by the host computer 10 proceeds to step S18 when the fraction exists (Yes), and proceeds to step S19 when no fraction exists (No).

At the step S18, the host computer 10 sets fraction flag. Thus, the processing operation proceeds to step S19.

At the step S19, the host computer 10 judges whether or not analysis processing with respect to all arithmetic blocks has been completed. When the analysis processing with respect to all arithmetic blocks has not been completed (No), the processing operation proceeds to step S19N.

At the step S19N, the host computer 10 reads thereinto information of the next arithmetic block to continue analysis. Namely, after the host computer 10 reads thereinto information of the next arithmetic block, the processing operation proceeds to step S15. On the other hand, when analysis processing with respect to all arithmetic blocks has been completed (Yes) at the step S19, the processing operation by the computer 10 proceeds to return to complete this subroutine SUB1.

Explanation will now be given in connection with parallel processing relating to processing program including integration processing with respect to, e.g., four pictures indicated below. This processing program has, e.g., an example of format described below.

```
vfor(Vinit=0; Vinit<512*2; Vinit+=512) {         ... (2-1)
  hfor(Hinit=0; Hinit<768*2; Hinit+=768) {       ... (2-2)
    vfor(Vinit=0; Vinit<512; Vinit+=8) {         ... (2-3)
      hfor(Hinit=0; Hinit<768; Hinit+=8) {       ... (2-4)
        read(x, 8, 8);                           ... (2-5)
        ..........
        tmp=x[0]+·····                           ... (2-6)
        ..........
        write(y, 8, 8);                          ... (2-7)
        ..........
        total=total+tmp;                         ... (2-8)
      }                                          ... (2-9)
    }                                            ... (2-10)
  }                                              ... (2-11)
}                                                ... (2-12)
..........
```

Figure 6:
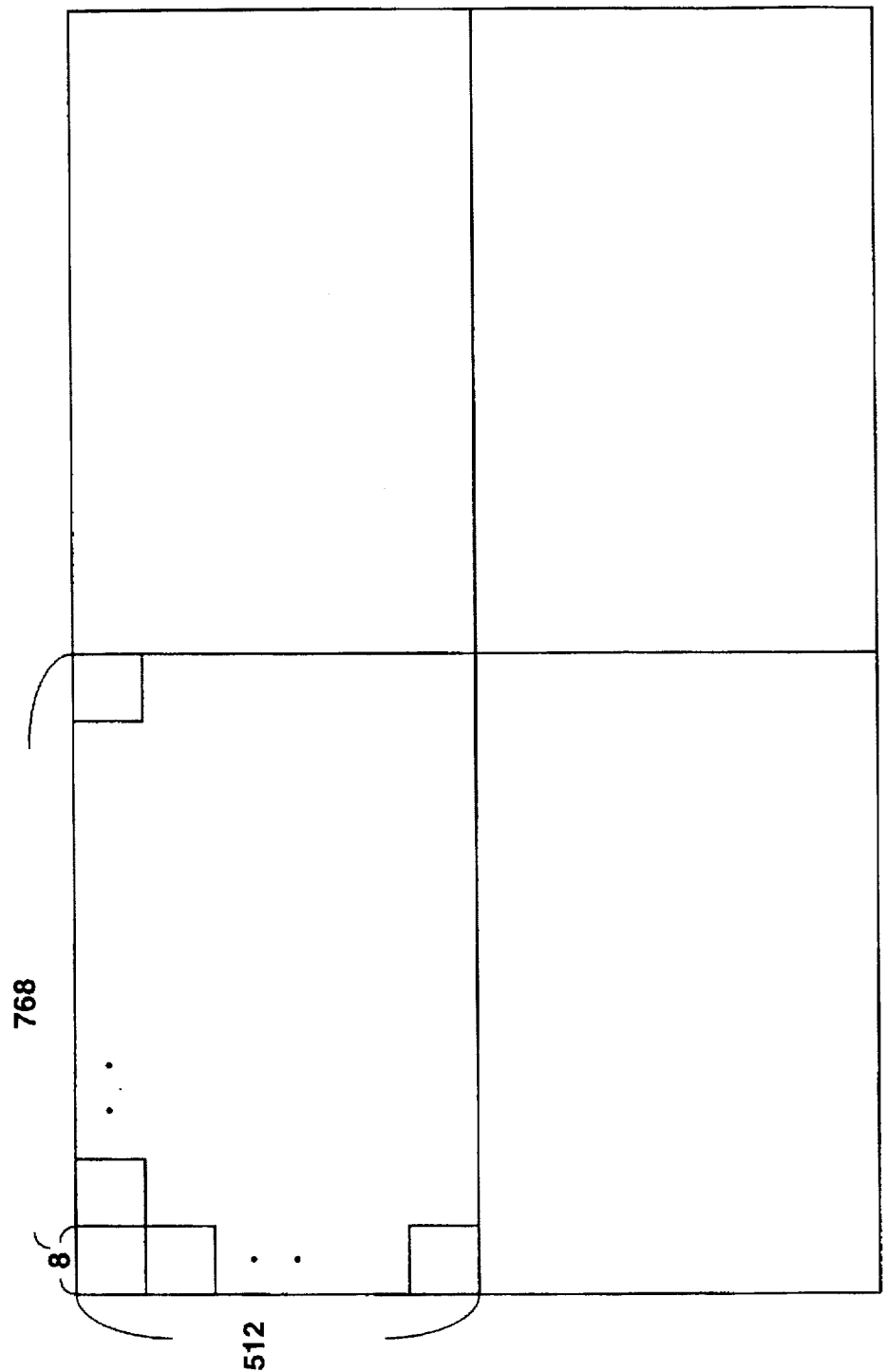
FIG. 6 is a model view showing an example of a picture in the case where picture parallel processing flag is raised (set) in the subroutine 2.

In this processing program, there is indicated the case where when, e.g., four arithmetic processors exist at the arithmetic section 3, image processing is carried out with respect to four pictures each comprised of 512×768 pixels as shown in FIG. 6, for example. In the case of such operation where all pictures are used as unit, there are instances where image processing to determine, e.g., density mean of all the pictures, etc. is carried out. In order to carry out such image processing on the basis of the model corresponding to the previously described architecture, the host computer 10 carries out, at subroutine SUB 2, discrimination between picture division processing including integration processing analyzed at the subroutine SUB 1 and picture parallel processing to carry out, in parallel, operation of picture (pictorial image) by corresponding processors every one frame unit.

Figure 5:
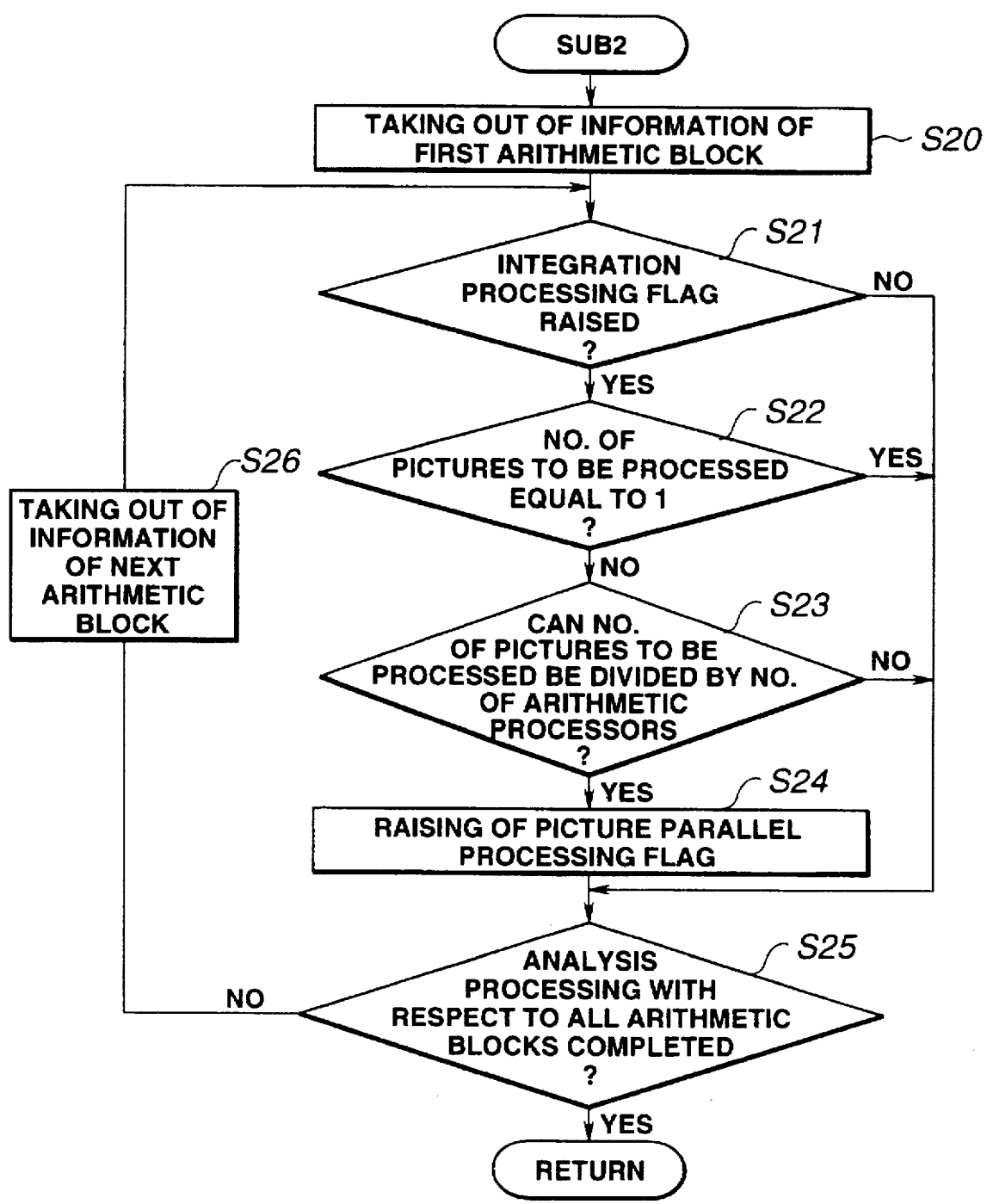
FIG. 5 is a flowchart for explaining processing procedure of the subroutine 2 in the main flowchart.

For example, as shown in FIG. 5, at step S20 of the flowchart of the subroutine SUB2, the host computer 10 takes out information of the first arithmetic block. Thus, the processing operation proceeds to step S21.

At the step S21, the host computer 10 carries out, by presence or absence of integration processing flag, discrimination as to whether or not there is the integration processing. When there is an integration processing as indicated by the statement (2-8), for example, since the integration processing flag should be raised (Yes), the processing operation by the host computer 10 proceeds to step S22. When there is no integration processing (No), the processing operation proceeds to step S25.

At the step S22, the host computer 10 carries out discrimination as to whether or not the number of pictures to be processed is equal to 1. When the number of pictures to be processed is 1 (Yes), the processing operation by the host computer 10 proceeds to the step S25. When the number of pictures to be processed is 2 or more (No), i.e., when a program as indicated by the statement (2-2) to the statement (2-5), for example, the processing operation proceeds to step S23.

At the step S23, the host computer 10 carries out discrimination as to whether or not the number of pictures to be processed can be divided by the number of arithmetic processors of the arithmetic section 3. When the number of pictures to be processed can be divided by the number of arithmetic processors (Yes), the processing operation by the host computer 10 proceeds to step S24. When the number of pictures to be processed cannot be divided by the number of arithmetic processors of the arithmetic section 3 (No), its processing operation proceeds to step S25.

At the step S24, the host computer 10 sets picture parallel processing flag. Thus, the processing operation proceeds to the step S25.

At the step S25, the host computer 10 judges whether or not analysis with respect to all arithmetic blocks has been completed. When the analysis of the arithmetic processing method has not been completed with respect to all the arithmetic blocks (No), the processing operation proceeds to step S26.

At the step S26, the host computer 10 reads thereinto information of the next arithmetic block to continue analysis. Namely, after the host computer 10 reads thereinto information of the next arithmetic block, the processing operation proceeds to step S22. On the other hand, when analysis processing with respect to all arithmetic blocks has been completed at the step S25 (Yes), the processing operation by the host computer 10 proceeds to return. Thus, the subroutine SUB2 is completed.

By carrying out discrimination between the picture parallel processing and the picture division processing in this way, measure is taken such that model based on, e.g., the previously described architecture is not broken when execution code generation at the subsequent subroutine SUB3 with respect to the program is carried out.

Figure 7:
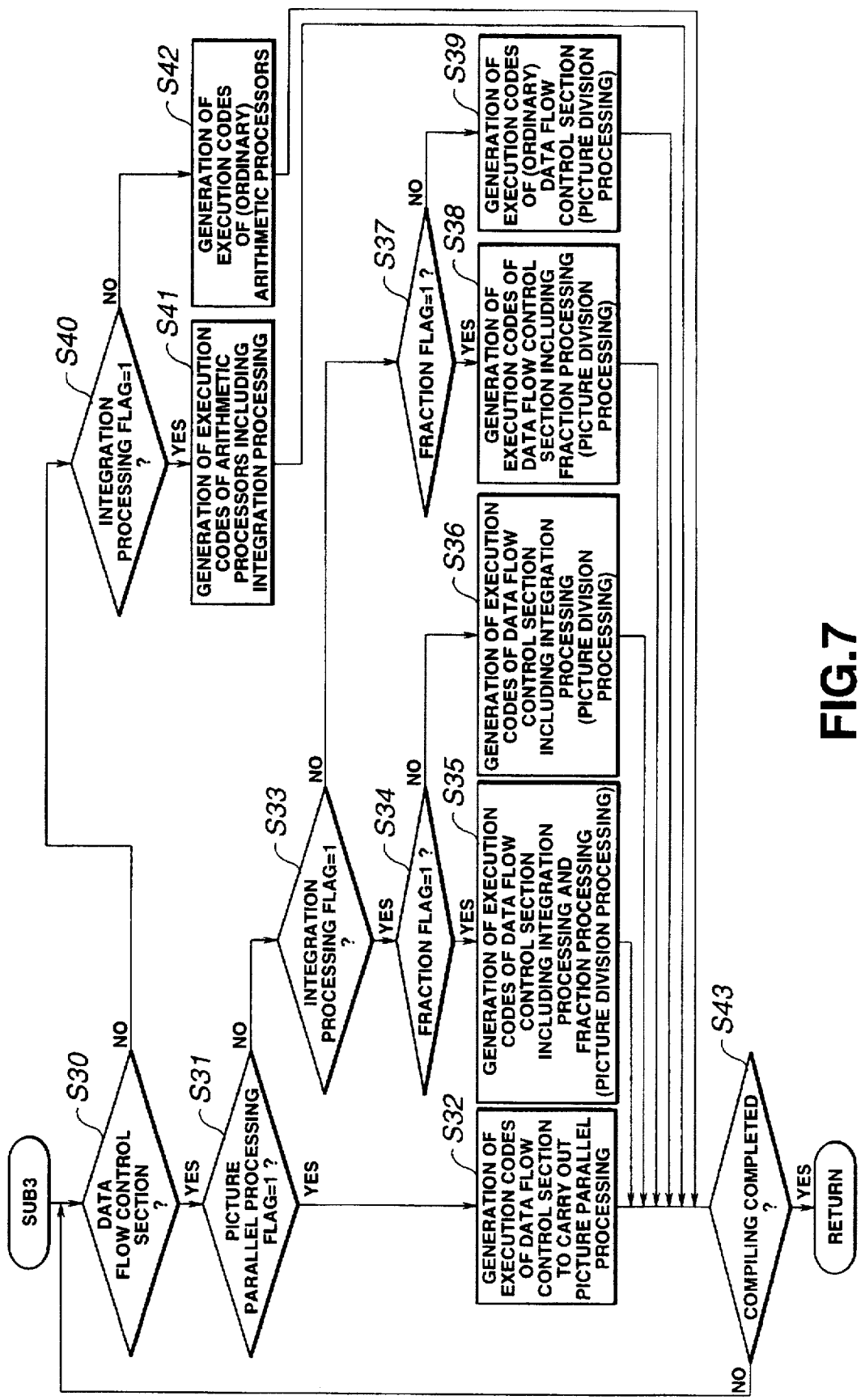
FIG. 7 is a flowchart for explaining processing procedure of the subroutine 3 in the main flowchart.

Compiling corresponding to the analysis result and the processing control of the source program carried out in this way is carried out in accordance with the flowchart of the subroutine SUB3 shown in FIG. 7.

Namely, at the step S30, the host computer 10 carries out discrimination as to whether or not source program delivered for implementation of compiling is program for data flow control section 2. In the case where the source program is program for data flow control section 2 (Yes), the processing operation by the host computer 10 proceeds to step S31. In the case where the source program is not program for data flow control section 2 (No), it is considered as program for arithmetic processor. Thus, the processing operation proceeds to step S40.

At the step S31, the host computer 10 discriminates as to whether or not the picture parallel processing flag is raised. When the picture parallel processing flag is raised (Yes), the host computer 10 judges that it is indicated that the number of pictures has been divisible by the number of arithmetic processors. Thus, the processing operation proceeds to step S32. When the picture parallel processing flag is not raised (No), the processing operation proceeds to step S33.

At the step S32, the host computer 10 delivers all data of one picture to corresponding one arithmetic processor to generate execution codes of the data flow control section 2 which carries out, in parallel, image processing with respect to a plurality of pictures. Thereafter, the processing operation proceeds to step S43. The processing of this step is a processing for taking, e.g., density mean value of one picture, or the like as more practical image processing. Thus, as execution codes generated with respect to the data flow control section 2, e.g., such execution codes to send data of one picture necessary for operation with respect to one arithmetic processor of the arithmetic section 3 are generated.

At step S33, the host computer 10 carries out judgment as to whether or not integration flag is raised. When the integration flag is not raised (No), the processing operation proceeds to step S37. When the integration flag is raised (Yes), the processing operation proceeds to step S34.

At the step S34, the host computer 10 carries out judgment as to whether or not fraction flag is raised. When the fraction flag is raised (Yes), the processing operation proceeds to step S35. When no fraction flag is raised (No), the processing operation proceeds to step S36.

At the step S35, the host computer 10 generates execution codes of the data flow control section 2 which carries out picture division processing including integration processing and fraction processing. Thus, the processing operation proceeds to step S43.

This picture division processing includes a processing for sending, as numeric values, data such as result obtained by performing an operation of integral processing, or the like to respective arithmetic processors of the arithmetic section 3 as occasion demands, whereby the respective arithmetic processors perform an operation on the basis of numeric values delivered thereto.

Namely, execution codes of the picture division processing are generated from a source program adapted to repeatedly carry out a control such that the processor of the data flow control section 2 reads out data of small areas corresponding to the number of arithmetic processors of the arithmetic section 3 from the shared memory within the input/output section 5 to deliver them into the distributed memories within respective arithmetic processors to collect the respective proceeded data into the shared memory within the input/output section 5 after operations of respective arithmetic processors have been completed.

Moreover, execution code of fraction processing is an execution code such that the number of processing repeatedly carried out with respect to picture data of the remainder area is increased by one so as to include conditional statement to inhibit write access with respect to the shared memory of the input/output section 5 of data processing result from the portion above the total number of small areas. Namely, the fraction processing means a processing such that the data flow control section 2 writes only operation results with respect to all small areas into the shared memory of the input/output section 5, and does not write operation results except for the above into the shared memory of the input/output section 5.

Then, at step S36, the host computer 10 generates execution codes of the data flow control section 2 which carries out picture division processing including integration processing. Thus, the processing operation proceeds to step S43.

On the other hand, when the processing operation proceeds to step S37 by judgment (No) of the step S33, the host computer 10 carries out, also at this step S37, similarly to the step S34, judgment as to whether or not fraction flag is raised. When the fraction flag is raised (Yes), the processing operation by the host computer 10 proceeds to step S38. When no fraction flag is raised (No), the processing operation proceeds to Step S39.

At the step S38, the host computer 10 generates execution codes of the data flow control section 2 which carries out picture division processing including fraction processing. Thus, the processing procedure proceeds to step S43.

At the step S39, the host computer 10 generates, in an ordinary manner, execution codes of the data flow control section 2. Thus, the processing operation proceeds to the step S43.

On the other hand, at the step S40, the host computer 10 carries out judgment as to whether or not integration processing flag is raised. When the integration processing flag is raised (Yes), the processing operation by the host computer 10 proceeds to step S41. When no integration processing flag is raised (No), the processing operation proceeds to the step S42.

At the step S41, the host computer 10 generates execution codes of arithmetic processors of the data flow control section 2 and the arithmetic section 3 including integration processing. Thus, the processing operation proceeds to step S43.

At the step S42, the host computer 10 generates, in an ordinary manner, execution codes of arithmetic processors of the arithmetic section 3. Thus, the processing operation proceeds to the step S43.

At the step S43, the host computer 10 carries out judgment as to whether or not generation of execution codes with respect to arithmetic processors of the data flow control section 2 and the arithmetic section 3 corresponding to all arithmetic blocks has been completed. When compiling has not yet been completed (No), the processing operation by the host computer 10 returns to the step S30 to repeat the above-described procedure. On the other hand, when compiling has been completed (Yes), the processing operation by the host computer 10 proceeds to return thus to complete the subroutine SUB3 which carries out this execution code generating processing.

As stated above, there is employed an approach to carry out switching of processing in dependency upon the number of pictures delivered and the number of arithmetic processors to carry out arithmetic processing of units of small areas or one frame in respective arithmetic processors of the arithmetic section 3, and to carry out integral arithmetic processing by the arithmetic processor of the data flow control section 2 to deliver, as occasion demands, the integral arithmetic processing result to respective arithmetic processors of the arithmetic section 3 to thereby permit respective arithmetic processors to devote themselves to image processing with respect to the given area, thus making it possible to limit the kind of execution codes generated by automatically selecting a higher efficiency method to one without destroying the model which satisfies the above-described architecture. Thus, generation quantity of execution codes generated can be held down as minimum as possible, and optimization of program can be also carried out.

Moreover, an approach is employed to detect identifier indicating parallel processing in the source program to make distinction between processing of the data flow control section 2 and that of the arithmetic section 3 on the basis of the identifier, and to generate execution codes with respect to a plurality of arithmetic processors of the arithmetic section 3 to thereby permit the program developer to write program without being conscious of sharing of role to respective arithmetic processors, thus making it possible to shorten time of program development. Thus, the development cost can be held down.

Further, an approach is employed to carry out the above-described fraction processing in correspondence with fraction (remainder) determined with respect to the number of arithmetic processors of the number of divided small areas, thereby making it possible to carry out efficient processing with the execution code quantity being held down to much degree as compared to the conventional execution code quantity.

In the image processing method, an approach is employed to undergo procedure to collect operation results at arithmetic processors of which roles are shared in dependency upon the number of divided pictures to carry out integration processing thereof to thereby permit generation quantity of execution codes in the image processing method to be reduced to much degree so that efficiency of image processing can be increased. Thus, development of short term can be made, and the development cost can be held down.

Moreover, in the image processing method, an approach is employed to examine the number of pictures to be processed and the number of arithmetic processors in accordance with a processing executed, such as, for example, processing of density mean, etc. to select a processing method to generate execution codes, thereby permitting processing speed to be higher than that of the conventional image processing. Thus, e.g., also in the application program, image processing is carried out without destroying the model which satisfies architecture required as one of parallel processing, thus permitting processing speed to be higher than that of the conventional image processing.

In addition, the image processing apparatus is adapted to carry out, at respective arithmetic processors of the arithmetic section, arithmetic processing of data that the data flow control section has delivered to carry out integral operation by using operation results of respective arithmetic processors collected at the data flow control section to distribute it for a second time to the respective arithmetic processors as occasion demands to thereby allow respective arithmetic processors of the arithmetic section to devote themselves to processing for calculation of given small areas to implement image processing by parallel processing to delivered picture signals, thus making it possible to carry out image processing higher than the prior art.

Industrial Applicability

In this invention, in compiling program prepared by using program language to allow a plurality of arithmetic processors to carry out, in parallel, image processing to generate execution codes, identification and analysis of control statement to which identifier indicating parallel processing in the image processing is attached are carried out from the prepared program, thus to generate execution codes of parallel processing to respective arithmetic processors corresponding to the analysis result and the number of plural arithmetic processors. Then, respective arithmetic processors carry out image processing on the basis of the generated execution codes to allow operation results of the respective arithmetic processors to undergo integration processing, whereby the program developer can describe (write) program without being conscious of sharing of role to respective processors. As a result, the development time of program can be shortened. Thus, burden on the program developer can be lessened, so the development cost can be held down to lower level.

What is claimed is:

1. An image processing method for implementation on a computer having a plurality of arithmetic processors and being controllable through a computer program, the method comprising:

analyzing a control statement of said computer program to determine whether or not a parallel image processing identifier has been attached to said control statement;

when said parallel image processing identifier has been attached to said control statement;

generating a plurality of execution codes for use by said arithmetic processors to carry out parallel processing of at least one image; and processing said images through said arithmetic processors according to said execution codes;

wherein said step of analyzing includes a step of determining whether or not the number of images subjected to image processing can be divided by the number of arithmetic processors without a remainder, and wherein when the number of images subjected to image processing can be divided by the number of arithmetic processors without a remainder, the step of generating execution codes is performed such that said images are divided equally among said arithmetic processors for processing.

2. An image processing method for implementation on a computer having a plurality of arithmetic processors and being controllable through a computer program the method comprising:

analyzing a control statement of said computer program to determine whether or not a parallel image processing identifier has been attached to said control statement;

when said parallel image processing identifier has been attached to said control statement;

generating a plurality of execution codes for use by said arithmetic processors to carry out parallel processing of at least one image; and processing said images through said arithmetic processors according to said execution codes; and wherein said images are partitioned into a plurality of small areas for processing and said step of analyzing includes a step of determining whether or not the number of small areas subjected to image processing can be divided by the number of arithmetic processors without a remainder, and wherein when the number of small areas cannot be divided by the number of arithmetic processors without a remainder, the step of generating execution codes includes generating an execution code or codes that inhibits writing the processing result until said remainder has been processed.

3. An image processing apparatus comprising:

a plurality of arithmetic processors for performing parallel processing on at least one image;

control means for selecting between a first processing mode and a second processing mode;

wherein in said first processing mode one or more of said images is partitioned into a plurality of small areas, said small areas are divided among said arithmetic processors for processing, and the processed small areas are combined to form one or more processed images; and in said second processing mode each said arithmetic processor processes one or more entire images; and data supply control means for integrating the processed data output by said arithmetic processors.

4. An image processing apparatus as set forth in claim 3, wherein when the number of images to be processed is 1 or a value obtained by dividing the number of images by the number of arithmetic processors has a remainder, said control means selects the first processing mode, and when the number of images can be divided by the number of arithmetic processors without a remainder, said control means selects the second processing mode.

5. An image processing method for implementation on a computer having a plurality of arithmetic processors and being controllable through a computer program, the method comprising:

analyzing a control statement of said computer program to determine whether or not a parallel image processing identifier has been attached to said control statement; and when said parallel image processing identifier has been attached to said control statement, generating a plurality of execution codes for use by said arithmetic processors to carry out parallel processing at least one image;

wherein said step of analyzing includes a step of determining whether or not the number of images subjected to image processing can be divided by the number of arithmetic processors without a remainder, and wherein when the number of images subjected to image processing can be divided by the number of arithmetic processors without a remainder, the step of generating execution codes is performed such that said images are divided equally among said arithmetic processors for processing.

6. An image processing method for implementation on a computer having a plurality of arithmetic processors and being controllable through a computer program, the method comprising:

analyzing a control statement of said computer program to determine whether or not a parallel image processing identifier has been attached to said control statement; and when said parallel image processing identifier has been attached to said control statement, generating a plurality of execution codes for use by said arithmetic processors to carry out parallel processing at least one image;

wherein said images are partitioned into a plurality of small areas for processing and said step of analyzing includes a step of determining whether or not the number of small areas subjected to image processing can be divided by the number of arithmetic processors without a remainder, and wherein when the number of small areas cannot be divided by the number of arithmetic processors without a remainder, the step of generating execution codes includes generating an execution code or codes that inhibits writing the processing result until said remainder has been processed.

* * * * *